US008311362B2

(12) United States Patent
Tamaru

(10) Patent No.: US 8,311,362 B2
(45) Date of Patent: Nov. 13, 2012

(54) IMAGE PROCESSING APPARATUS, IMAGING APPARATUS, IMAGE PROCESSING METHOD AND RECORDING MEDIUM

(75) Inventor: Masaya Tamaru, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 762 days.

(21) Appl. No.: 12/457,492

(22) Filed: Jun. 12, 2009

(65) Prior Publication Data

US 2009/0310885 A1 Dec. 17, 2009

(30) Foreign Application Priority Data

Jun. 13, 2008 (JP) ................................ 2008-155460

(51) Int. Cl.
*G06K 9/40* (2006.01)
*H04N 1/46* (2006.01)
(52) U.S. Cl. ........................ 382/275; 358/532
(58) Field of Classification Search .......... 382/263–264, 382/274–275, 312, 254, 255; 348/207.99; 345/611, 647; 358/447, 463, 532
See application file for complete search history.

(56) References Cited

U.S. PATENT DOCUMENTS

| 6,359,706 B1 * | 3/2002 | Arita et al. ..................... 358/486 |
| 7,058,233 B2 | 6/2006 | Silber |
| 7,369,161 B2 * | 5/2008 | Easwar et al. ............. 348/222.1 |
| 7,463,784 B2 * | 12/2008 | Kugo ............................ 382/263 |
| 7,876,979 B2 * | 1/2011 | Lee et al. ....................... 382/300 |
| 2004/0080661 A1 | 4/2004 | Afsenius et al. |
| 2009/0059026 A1 | 3/2009 | Katagiri et al. |

FOREIGN PATENT DOCUMENTS

| JP | 6-311411 | 11/1994 |
| JP | 2009-59058 | 3/2009 |
| JP | 2009-98436 | 5/2009 |

OTHER PUBLICATIONS

Helmy A. Eltoukhy, et al., "A Computationally Efficient Algorithm for Multi-Focus Image Reconstruction," Proc. SPIE, Electronic Imaging, vol. 5017, No. 332, Oct. 23, 2003, XP002543848.
Kazuya Kodama, et al., "Simple and Fast All-In-Focus Image Reconstruction Based on Three-Dimensional/Two-Dimensional Transform and Filtering," IEEE International Conference on Acoustics, Speech and Signal Processing (ICASSP), vol. 1, Apr. 20, 2007, XP002543849.
Extended European Patent Office Search Report dated Sep. 11, 2009.
Report on Prior-Art Search and English translation thereof, (2009).

* cited by examiner

*Primary Examiner* — Kanjibhai Patel
(74) *Attorney, Agent, or Firm* — McGinn IP Law Group, PLLC

(57) ABSTRACT

Sharpness is calculated in all of focus-bracketed images on a pixel basis. Then, a first reference value indicating an image of the plurality of images to which a pixel whose sharpness is the highest among the pixels located on the identical positions in the plurality of images belongs is obtained on each pixel of the images, and a second reference value is calculated based on the first reference value on each pixel by spatially smoothing the first reference value on each pixel based on the first reference values on adjacent pixels. The focus-bracketed images are processed based on the second reference values to generate an omni-focus image or a blur-enhanced image. Accordingly, it is possible to judge a region having high contrast as an in-focus region and acquire a synthesized image having smooth gradation.

16 Claims, 16 Drawing Sheets

FIG.4

| 0 | 1 | 0 |
|---|---|---|
| 1 | −4 | 1 |
| 0 | 1 | 0 |

FIG.5

| 0 | 128 | 64 | 0 | 191 | 128 |
|---|---|---|---|---|---|
| 128 | 191 | 255 | 128 | 64 | 64 |
| 64 | 0 | 64 | 128 | 191 | 0 |
| 128 | 255 | 0 | 64 | 128 | 191 |
| 64 | 255 | 191 | 64 | 191 | 128 |

| 128 |
|---|
| 0 | 0 |

FIG.6

| 1 | 2 | 1 |
|---|---|---|
| 2 | 4 | 2 |
| 1 | 2 | 1 |

FIG.7

| 60 | 108 | 100 | 84 | 116 | 124 |
|---|---|---|---|---|---|
| 92 | 124 | 135 | 120 | 104 | 80 |
| 100 | 104 | 104 | 116 | 116 | 84 |
| 120 | 135 | 100 | 96 | 131 | 135 |
| 124 | 183 | 151 | 112 | 139 | 151 |

| 71 |
|---|
| 33 | 28 |

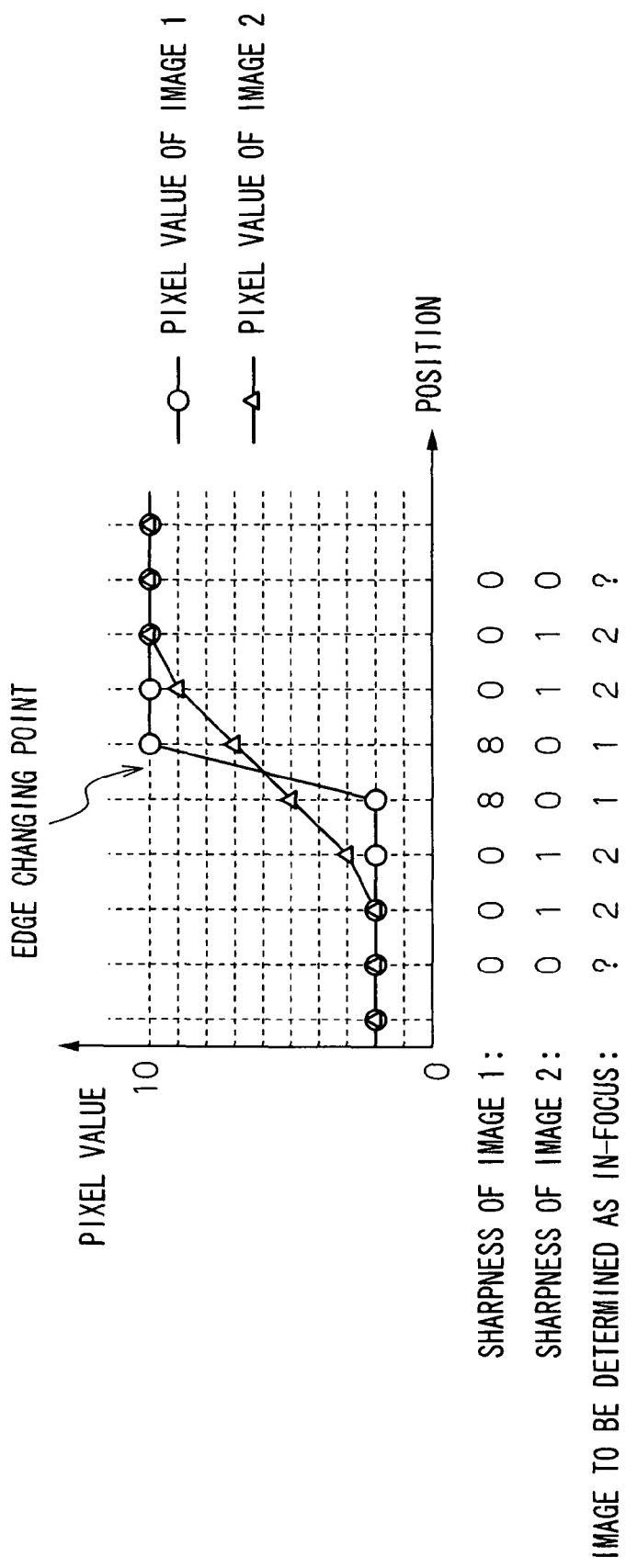

IMAGE PROCESSING APPARATUS, IMAGING APPARATUS, IMAGE PROCESSING METHOD AND RECORDING MEDIUM

BACKGROUND OF THE INVENTION

1. Field of the Invention

The present invention relates to an image processing apparatus, an imaging apparatus, and a range image generating method and a program, more particularly, to the image processing apparatus, the imaging apparatus, and the range image generating method and the program which can acquire an omni-focus image or a blur-enhanced image by focus bracketing.

2. Description of the Related Art

As a technique for acquiring an omni-focus image using a plurality of images acquired by focus bracketing (hereinafter referred to as focus-bracketed images), which consecutively captures object images while varying the focus position of a lens, Japanese Patent Application Laid-Open No. H06-311411 discloses a technique for generating a synthesized image without blurredness by judging contrast on each pixel in the focus-bracketed image using a differential filter (see SA-SA2 in FIG. 17), determining a region between pixels which have a contrast equal to or higher than a prescribed contrast and form a "pair" as a high contrast in-focus region (see SA3-SE in FIG. 17), and synthesizing only the pixels in the in-focus region from each image.

As a method for performing, using the focus-bracketed images, omni-focus processing in order to acquire an image (omni-focus image) where every object is in-focus in a frame or blur enhancement processing in order to acquire an image (blur-enhanced image) where a principal object is in-focus but the other objects are blurred beyond an actual depth of field, a method is used that judges which image is most focused among the focus-bracketed images on a pixel basis using sharpness calculated by a differential filter or the like on an image basis and a pixel basis and, based on the result, calculates a synthesized weighted coefficient for the omni-focus processing or a blurring amount for blur enhancement processing.

SUMMARY OF THE INVENTION

However, the invention described in Japanese Patent Application Laid-Open No. H06-311411 uses the region between pixels which have a contrast equal to or higher than a prescribed contrast and form a "pair" as an in-focus region, causing a problem of lacking in stability. More specifically, if a misjudgment is made when a signal is detected due to noise or the like on a pixel other than the pixel on which a signal should be detected to form the pair, a problem is caused where a high contrast region cannot be judged as the in-focus region.

Furthermore, in the invention described in Japanese Patent Application Laid-Open No. H06-311411, variation in pixel values is abrupt at a boundary between an in-focus region and an out-of-focus region, causing a problem of discontinuous gradation levels and an unnatural synthesized image.

In the method in which sharpness calculated by a differential filter or the like on an image basis or a pixel basis is used to judge which image is most focused among the focus-bracketed images on a pixel basis and, based on the result, a synthesized weighted coefficient for the omni-focus processing or a blurring amount for blur enhancement processing is calculated, an in-focus judgment result is merely acquired based on the sharpness on a pixel basis, which causes a problem that the in-focus judgment is apt to result in a spatially discontinuous value and it is not unusual that a desired value cannot be acquired.

FIG. 18 is a graph showing change, with attention to a certain edge of a object, between an image 1 focusing on the edge and a defocusing image 2 among the focus-bracketed images, a result acquired by applying a differential filter of [1, −2, 1] to each pixel of the image 1 and the image 2 and calculating the absolute value of the application as sharpness, and a result (range image) acquired by judging an image number where the sharpness is high on the pixel as in-focus, on pixel basis.

Since in the image 1 the pixel values abruptly change at the changing point of the edge, the sharpness becomes a high value, "8." Since there is no change in pixel value on other than the changing point of the edge, the sharpness becomes "0." On the other hand, since in the image 2 the pixel values change gently around the changing point of the edge, the sharpness of the pixel values becomes "1." Since the rate of change in the pixel values is constant on the changing point of the edge, the sharpness becomes "0."

Certainly, it is judged that the image 1 is focused because the sharpness of the image 1 is higher than the sharpness of the image 2 around the edge changing point (a prior pixel and a subsequent pixel). However, although it is considered that focus actually falls on the image 1 in a region near the edge changing point, the sharpness of the image 2 is higher than the sharpness of the image 1. Therefore, on the contrary to the actual state, it is understood that misjudgment considering focus falls on the image 2 is apt to be made. This is because in the image 2 the blurred edge spatially spreads, widening the region where the sharpness is calculated, while the pixels on which the sharpness is calculated is limited only within a region of the changing point of the abrupt edge, in the image 1.

In a region peripheral to the edge changing point, or a region where the pixel values are invariant in both of the image 1 and the image 2, both sharpness values are identical to "0." It is however possible to be misjudged that focus falls on the image whose sharpness is something other than "0", when a slight noise in an image sensor or the like makes the sharpness something other than "0". In other words, a situation occurs where it is uncertain which image is judged in-focus due to the effect of the noise.

As described above, in-focus judgment with reference to the sharpness on each pixel causes spatial discontinuity of processing or misjudgment, and is likely to cause a problem of an unnatural omni-focus or blur-enhanced image.

Furthermore, since only the number of the image having high sharpness on the pixel is used for the judgment of focusing, the high sharpness value "8" near the edge changing point (adjacent pixels before and after the pixel) in the image 1 cannot be reflected.

The present invention is made in view of the above situations. The present invention aims to provide an image processing apparatus, an imaging apparatus, an image processing method and a program (and recording medium) which can stably judge a region having high contrast as an in-focus region and acquire a synthesized image having smooth gradation.

In order to achieve the above-mentioned object, an image processing apparatus according to a first aspect of the present invention, comprises: an image acquiring device which acquires a plurality of images consecutively shot while varying a focus position of a lens; a sharpness calculating device which calculates sharpness on each pixel of the plurality of images acquired by the image acquiring device; a first reference value calculating device which calculates a first reference value indicating an image of the plurality of images to which a pixel whose sharpness calculated by the sharpness calculating device is the highest among the pixels located on an identical position in the plurality of images belongs, on each pixel of the images; a second reference value calculating device which calculates a second reference value on each pixel of the images based on the first reference value calculated by the first reference value calculating device by spatially smoothing the first reference value on each pixel based on the first reference values on adjacent pixels; and an image processing device which image-processes at least one of the plurality of images based on the second reference values.

According to the first aspect of the present invention, a plurality of images are acquired while varying the focus position of the lens, and sharpness on each pixel of the acquired plurality of images is calculated. The first reference value, which indicates an image of the plurality of images which includes the pixel whose sharpness is the highest, is calculated on a pixel basis. The second reference value is calculated by spatially smoothing the calculated first reference value based on the first reference value on adjacent pixels. The plurality of images are image-processed based on the calculated second reference value. This allows the transition between the second reference values representing an in-focus distribution to be smoothed. In other words, smoothness in a gradational level direction and/or in a spatial direction can be attained. Therefore, a naturally processed image can be acquired.

Here, the image processing device may image-process the plurality of images acquired by the image acquiring device based on the second reference values calculated by the second reference value calculating device to generate an omni-focus image where every part of the image is in focus. Accordingly, a natural omni-focus image can be acquired. "To generate an omni-focus image where every part of the image is in focus" means to generate a synthesized image by combining parts where focus is obtained (in-focus parts) in respective images acquired by the image acquiring device. It is not required, in the present invention, to take the focus in parts where focus is not obtained (out-of-focus parts) in all of the plurality of acquired images. That is, when a part A is out of focus in all of the images, the part A remains out of focus even though the omni-focus processing is performed.

In addition, the image processing device may image-process one of the plurality of images acquired by the image acquiring device based on the second reference values calculated by the second reference value calculating device to generate a blur-enhanced image where a portion except a principal object is blurred. Accordingly, a natural blur-enhanced image can be acquired.

According to a second aspect of the present invention, in the image processing apparatus according to the first aspect, the second reference value calculating device includes a map generating device which generates a map where the first reference value calculated by the first reference value calculating device on each pixel of the images is arranged according to a position of each pixel, and calculates the second reference value by spatially smoothing the map generated by the map generating device.

In the image processing apparatus of the second aspect, a map is generated by arranging the first reference value concerning each pixel of the images according to the position of each pixel. The second reference value is calculated by spatially smoothing the generated map. Thus, smoothness of the second reference value in the gradational level direction and/or in the spatial direction can be attained.

According to a third aspect of the present invention, in the image processing apparatus according to the first aspect, the first reference value includes first information indicating an image of the plurality of images to which the pixel whose sharpness is the highest belongs and second information indicating a level of the sharpness.

In the image processing apparatus of the third aspect, the first reference value includes the first information indicating an image of the plurality of images to which the pixel whose sharpness is the highest belongs and the second information indicating a level of sharpness. Thus, in-focus judgment can be made reflecting the level of sharpness.

According to a fourth aspect of the present invention, in the image processing apparatus according to the third aspect, the first reference value is represented as a two dimensional vector where the first information is an argument and the second information is a radius.

In the image processing apparatus of the fourth aspect, the first reference value is represented as a two dimensional vector where the first information indicating the image of the plurality of images to which the pixel whose sharpness is the highest belongs is an argument and the second information indicating the level of the sharpness is a radius. Thus, in-focus judgment can be made reflecting the level of sharpness.

According to a fifth aspect of the present invention, in the image processing apparatus according to the fourth aspect, the second reference value calculating device includes a map generating device which separates the first reference value represented as the two dimensional vector on each pixel in the image into an x component and a y component and generates maps of the x component and the y component in which the x component and the y component are arranged according to the position of each pixel, respectively, and spatially smoothes the map of the x component and the y component generated by the map generating device, acquires an argument from the spatially smoothed x component and y component and uses the argument as the second reference value.

In the image processing apparatus of the fifth aspect, the first reference value represented as the two dimensional vector is separated into the x component and the y component. The maps of the x component and the y component are generated by arranging the split x component and the y component according to the position of each pixel, respectively. The argument of the two dimensional vector is acquired from the x component and the y component acquired by spatially smoothing the maps of the respective x component and y component. The argument is used as the second reference value. This actualizes the spatial smoothing, attaching the great importance not only to the information indicating an image of the plurality of images to which the pixel whose sharpness is the highest belongs but also the level of sharpness. Therefore, a more precise in-focus distribution can be acquired.

According to a sixth aspect of the present invention, in the image processing apparatus according to the second or fifth aspect, the map generating device weighted-averages the first reference values in a prescribed area and generates a low resolution map having smaller number of samples than that of the map.

In the image processing apparatus of the sixth aspect, a low resolution map having smaller number of samples is generated by weighted-averaging the first reference values in the prescribed area and the second reference value is calculated by spatially smoothing the generated low resolution map. This allows the processing to become fast and the memory to be conserved.

According to a seventh aspect of the present invention, the image processing apparatus according to any one of the first to sixth aspects, further comprises: a device which determines a weighted average coefficient on each pixel on the identical position in the plurality of images based on the second reference value calculated by the second reference value calculating device; and a device which generates the omni-focus image by weighted-averaging the pixels on the identical position in the plurality of images based on the determined weighted average coefficient.

In the image processing apparatus of the seventh aspect, the weighted average coefficient on each pixel on the identical position in the plurality of images is determined based on the second reference value, and the omni-focus image is generated by weighted-averaging the plurality of images based on the determined weighted average coefficient.

According to an eighth aspect of the present invention, the image processing apparatus according to any one of the first to seventh aspects, further comprises: a device which determines a filter coefficient of a blurring filter for adjusting a level of blurring on each pixel of a reference image from among the plurality of images based on the second reference value calculated by the second reference value calculating device; and a device which generates the blur-enhanced image by performing filtering processing on the corresponding pixel in the reference image using the blurring filter having the determined filter coefficient.

In the image processing apparatus of the eighth aspect, the filter coefficient for adjusting the level of blurring on each pixel of the reference image from among the plurality of images is determined based on the second reference value, and the blur-enhanced image is generated by performing filtering processing on the corresponding pixel in the reference image using the blurring filter having the determined filter coefficient. Thus, the blur-enhanced image where the focus falls only on a principal object while the other region is blurred by an appropriate blurring amount can be acquired.

An imaging apparatus according to a ninth aspect of the present invention, comprises: the image processing apparatus according to any one of the first to eighth aspects; an imaging device which includes an image sensor capturing an object image and an imaging optical system forming the object image on the image sensor; and a control device which controls the imaging device so as to form the plurality of images on the image sensor.

An image processing method according to a tenth aspect of the present invention, comprises a step of acquiring a plurality of images consecutively shot while varying a focus position of a lens; a step of calculating sharpness on each pixel of the acquired plurality of images; a step of calculating a first reference value indicating an image of the plurality of images to which a pixel whose calculated sharpness is the highest among the pixels located on an identical positions in the plurality of images belongs, on each pixel of the images; a step of calculating a second reference value based on the calculated first reference value on each pixel of the images by spatially smoothing the first reference value on each pixel based on the first reference values on adjacent pixels; and a step of image-processing at least one of the plurality of images based on the second reference values.

According to an eleventh aspect of the present invention, in the image processing method according to the tenth aspect, the step of image-processing includes processing the plurality of images based on the second reference value to generate an omni-focus image where every part of the image is in focus, or processing one of the plurality of images based on the second reference value to generate a blur-enhanced image where a portion except a principal object is blurred.

A program according to a twelfth aspect of the present invention is a program for making a processor perform the image processing method according to the tenth or eleventh aspect. The program can be recorded on a recording medium.

According to the present invention, a region having high contrast can be stably judged as an in-focus region, and thus a synthesized image having smooth gradation can be acquired.

BRIEF DESCRIPTION OF THE DRAWINGS

FIG. 4 is an example of a Laplacian filter used for calculating sharpness;

FIG. 5 is an example of a map for one frame showing spatial distribution of first reference values by arranging the first reference values, which have been calculated on respective pixels, according to the respective positions of the pixels;

FIG. 6 is an example of a smoothing filter used for spatial smoothing;

FIG. 7 is an example of a map of reference values (second reference values) after spatial smoothing;

FIG. 18 illustrates a conventional in-focus judgment method.

DETAILED DESCRIPTION OF THE PREFERRED EMBODIMENTS

The best mode of preferred embodiments for implementing an image processing apparatus, an imaging apparatus, an image processing method and a program to which the present invention is applied will be described below in detail.

<First Exemplary Embodiment>

Figure 1:
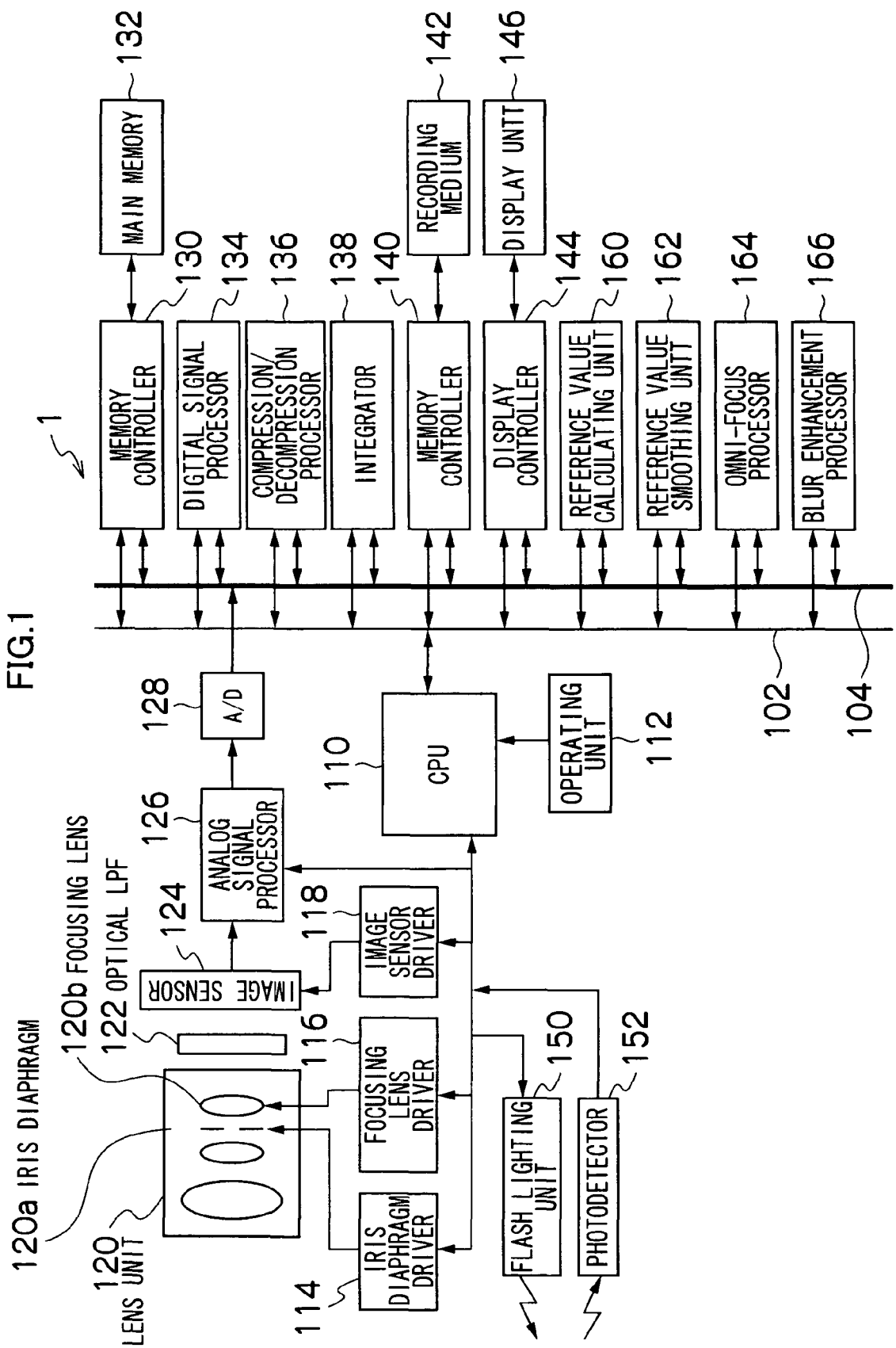
FIG. 1 is a block diagram showing an electric configuration of a digital camera 1 to which the present invention is applied.

FIG. 1 is a block diagram schematically showing the internal configuration of a digital camera 1 according to a first exemplary embodiment.

As shown in the figure, the digital camera 1 principally includes a CPU 110, an operating unit (a shutter release button, a power/mode-selector switch, a mode selector dial, a zooming button, a cross button, a menu/OK button, a DISP button, a BACK button etc.) 112, an iris diaphragm driver 114, a focusing lens driver 116, an image sensor driver 118, a lens unit 120, an optical low-pass filter (LPF) 122, an image sensor 124, an analog signal processor (CDS/AMP) 126, an A/D convertor 128, a memory controller 130, a main memory 132, a digital signal processor 134, a compression/decompression processor 136, an integrator 138, a memory controller 140, a recording medium 142, a display controller 144, a display unit 146, a flash lighting, unit 150, a photodetector 152, a reference value calculating unit 160, a reference value smoothing unit 162, an omni-focus processor 164, and a blur enhancement processor 166.

The CPU 110 controls the overall operation of the digital camera 1 according to a prescribed control program based on an operation signal inputted through the operating unit 112.

The lens unit 120 principally includes an iris diaphragm 120a and a focusing lens 120b. The iris diaphragm 120a is driven by the iris diaphragm driver 114 which includes a motor and a motor driver. The iris diaphragm driver 114 adjusts an aperture diameter based on aperture value data (f stop number) outputted from the CPU 110. The focusing lens 120b is driven along the optical axis direction by the focusing lens driver 116 which includes a motor and a motor driver. The focusing lens driver 116 controls travel of each lens based on driving amount data outputted from the CPU 110.

The image sensor 124 includes a color CCD having a light receiving surface where a number of photodiodes (light receiving elements) are two-dimensionally arranged via color filters of red (R), green (G) and blue (B) which are arranged according to a prescribed arrangement structure (such as Bayer, G stripe or else). Object light having passed the lens unit 120 and the optical LPF 122 is detected by each of the photodiodes and converted into a signal charge according to the amount of incident light.

The image sensor driver 118 outputs a timing signal for driving the image sensor 124, according to an instruction from the CPU 110.

The analog signal processor 126 samples and holds (correlation double sampling processing) R, G and B signals concerning each pixel in image signals outputted from the image sensor 124, and amplifies and outputs the signals to the A/D convertor 128.

The A/D convertor 128 converts the analog R, G and B signals outputted from the analog signal processor 126 into digital R, G and B signals, and outputs the converted signals.

The memory controller 130 outputs the digital R, G and B signals outputted from the A/D convertor 128 to the main memory 132. The imaging signal stored in the main memory 132 is transmitted to the digital signal processor 134 via a data bus 104.

The digital signal processor 134 includes a synchronization circuit (a processing circuit which converts the color signals into synchronized signals by interpolating the spatial deviations in the color signals due to the color filter arrangement of a single CCD), a white balance correction circuit, a gamma-correction circuit, an edge correction circuit, a luminance and color-difference signal generating circuit and the like, and generates image data (YUV data) including luminance data (Y data) and color-difference data (Cr and Cb data) by performing required signal processing on the inputted image signal according to an instruction from the CPU 110.

The compression/decompression processor 136 generates compressed image data by performing a prescribed system of compression processing on inputted image data according to an instruction from the CPU 110, and also generates uncompressed image data by performing a prescribed system of decompression processing on inputted compressed image data according to an instruction from the CPU 110. The data generated by the compression/decompression processor 136 is stored in the main memory 132 via the memory controller 130.

The integrator 138 cuts out a signal in an AF area (e.g. the center portion of a frame) and integrates absolute value data in the AF area according to an instruction from the CPU 110. The integrator 138 also splits a frame into a plurality of areas (e.g. 16×16) and calculates integrated values of the R, G and B image signals on each split area as physical quantities necessary for AE control according to an instruction from the CPU 110.

The memory controller 140 controls reading and writing of data from and onto the recording medium 142 inserted into a medium slot according to an instruction from the CPU 110.

The display controller 144 controls display on the display unit 146 according to an instruction from the CPU 110. More specifically, the display controller 144 converts the inputted image signal into a video signal (e.g. NTSC (National Television System Committee) signal, PAL (Phase Alternation by Line) signal or SECAM (Sequential Couleur A Memorie) signal) to be displayed on the display unit 146 and outputs the video signal onto the display unit 146 according to the instruction from the CPU 110.

The flush lighting unit 150 is provided with, for example, a xenon tube as a light source, and is made such that the amount of luminance is adjustable. A flush lighting whose light source is a high-intensity LED, instead of the xenon tube, can also be used. The CPU 110 shuts off the current to the flush lighting unit 150 and terminates the emission from the flush lighting unit 150 when the amount of light received by the photodetector 152 reaches a prescribed amount.

The reference value calculating unit 160 calculates a first reference value on a pixel basis. The first reference value indicates an image having the highest sharpness with respect to a pixel located in the identical position among a plurality of images taken by focus bracketing. The reference value calculating unit 160 creates a map showing spatial distribution of the first reference values by arranging the first reference values, which are calculated on a pixel basis, in respective positions of the pixels. The reference value calculating unit 160 will be described in detail later.

The reference value smoothing unit 162 calculates a second reference value by performing spatial smoothing processing, which is application of a smoothing filter, on the map created by the reference value calculating unit 160. The reference value smoothing unit 162 will be described in detail later.

The omni-focus processor 164 performs omni-focus processing based on the second reference values calculated by the reference value smoothing unit 162. The omni-focus processing is to create an image (omni-focus image) where every object in the frame is in-focus from the focus-bracketed images. The omni-focus processor 164 will be described in detail later.

The blur enhancement processor 166 performs blur enhancement processing for creating an image (blur-enhanced image) where only a principal object is in-focus while the other objects are blurred beyond an actual depth of field. The blur enhancement processor 166 will be described in detail later.

The operation of the digital camera 1 according to the exemplary embodiment configured as described above will be described. First, an ordinary shooting processing will be described.

The digital camera 1 is set to a shooting mode by setting the power/mode-selector switch on a shooting position, thereby enabling the camera to shoot. The setting of the shooting mode projects the lens unit 120 and the camera enters into a shooting standby status.

In this shooting mode, the object light having passed the lens unit 120 forms an image on the light receiving surface of the image sensor 124, and is converted into a signal charge according to the amount of incident light. The signal charge accumulated in each photodiode is read out in sequence as a voltage signal (image signal) according to the signal charge on the basis of driving pulses supplied by the image sensor driver 118, and supplied to the analog signal processor (CDS/AMP) 126.

Analog R, G and B signals outputted from the analog signal processor 126 are converted into digital R, G and B signals by the A/D convertor 128 and supplied to the memory controller 130. The memory controller 130 outputs the digital R, G and B signals outputted from the A/D convertor 128 to the memory 132.

When the shot image is outputted to the display unit 146, the luminance and color-difference signal is generated by the digital signal processor 134 based on the image signal outputted from the memory controller 130 to the memory 132, and the signal is transmitted to the display controller 144. The display controller 144 converts the inputted luminance and color-difference signal into a signal system for display (e.g. color composite video signal of the NTSC system) and outputs the converted signal onto the display unit 146. Thus, the image captured by the image sensor 124 is displayed on the display unit 146.

The image signal is captured from the image sensor 124 at regular time intervals, the image data in the main memory 132 is overwritten at regular time intervals with the luminance and color-difference signal generated from the image signal, and outputted onto the display unit 146, thereby displaying the image captured by the image sensor 146 is displayed in real time. A user can recognize the shooting angle of view by looking at the image (through image) displayed in real time on the display unit 146.

Shooting is performed by pressing the shutter release button. A half pressing of the shutter release button enters an S1-on signal into the CPU 110.

First, the image signal captured from the image sensor 124 via the memory controller 130 enters into the integrator 138. The CPU 110, while controlling the focusing lens driver 116 to actuate the focusing lens 120b based on the absolute value data in the AF area calculated by the integrator 138, computes focus evaluation values (AF evaluation values) on respective AF detection points, and determines the lens position maximizing the evaluation value as an in-focus position. The focusing lens driver 116 is controlled such that the group of focusing lenses travels to the acquired in-focus position.

The CPU 110 detects luminance of the object (object luminance) based on the integrated value of R, G and B image signals calculated by the integrator 138, and calculates an exposure value appropriate for shooting (shooting EV). The CPU 110 then determines an aperture and a shutter speed based on the acquired shooting EV and a prescribed program diagram, according to which the CPU 110 acquires an appropriate exposure value by controlling an electronic shutter of the image sensor 124 and the iris diaphragm driver 114. Simultaneously, the CPU 110 judges whether the firing of the flush lighting is required or not based on the detected object luminance.

The CPU 110 acquires R/G and B/G ratios on a split area basis based on the integrated value of R, the integrated value of B and the integrated value of G calculated by the integrator 138, and determines the light source type based on the distribution of the acquired R/G and B/G values in a color space and the like. According to a white balance adjustment value appropriate for the determined light source type, the CPU 110 controls gain values (white balance correction value) concerning the R, G and B signals in the white balance correction circuit to correct the signal of each color channel such that, for instance, the value of each ratio becomes about 1 (i.e. an integrated ratio of R, G and B in a frame is $R:G:B \cong 1:1:1$).

As described above, a half pressing of the shutter release button performs the AE processing, AF processing and AWB processing, during which the user operates the zooming button as required to adjust the angle of view by zooming the lens unit 120 and the CPU 110 continuously performs the AE/AF processing and AWB processing.

Subsequently, full pressing of the shutter release button enters an S2-on signal into the CPU 110, and the CPU 110 starts shooting and recording processing. More specifically, the image sensor 124 is exposed with the shutter speed and aperture determined based on a photometered result. At this time, the CPU 110 may fire the flush lighting unit 150 as required.

The image signal outputted from the image sensor 124 is captured into the memory 132 via the analog signal processor 126, the A/D convertor 128 and the memory controller 130, converted into the luminance and color-difference signal by the digital signal processor 134, and then stored into the memory 132.

The image data stored in the memory 132 is supplied to the compression/decompression processor 136, compressed according to a prescribed compression format (e.g. JPEG system), and then stored in the memory 132. The stored data is subsequently converted into an image file of a prescribed image recording format (e.g. Exif system) and then recorded onto the recording medium 142 via the memory controller 140.

Figure 2:
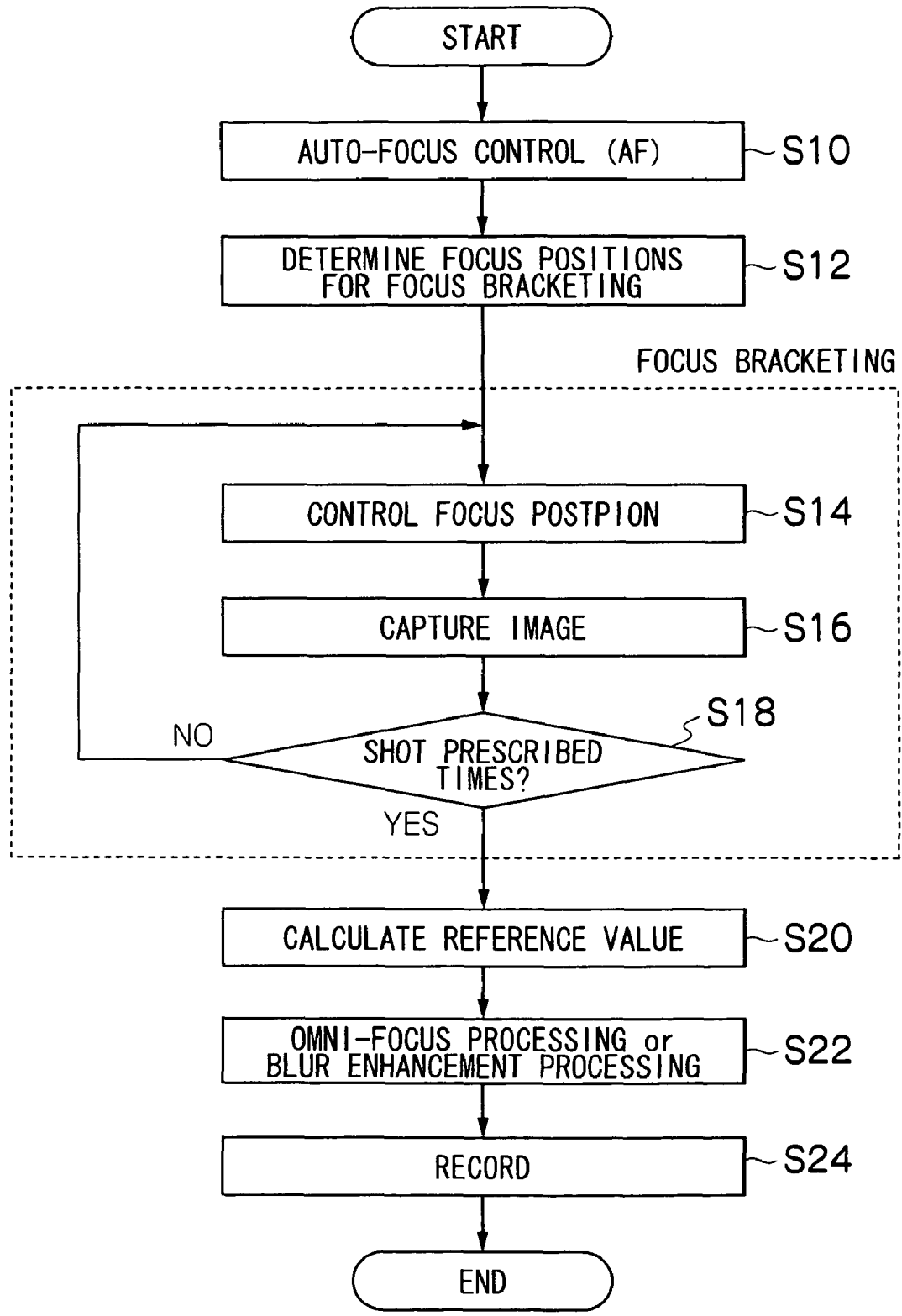
FIG. 2 is a flowchart showing the entire processing flow in an omni-focus image/blur-enhanced image shooting mode of the digital camera 1.

Next, shooting processing of an omni-focus image or a blur-enhanced image will be described below. FIG. 2 is a flowchart showing the entire processing flow in an omni-focus image/blur-enhanced image shooting mode for shooting an omni-focus image or a blur-enhanced image. The omni-focus image/blur-enhanced image shooting mode is set by operating the mode selector dial of the operating unit 112 in a status where the shooting mode has been set using the power/mode-selector switch.

When a half pressing of the shutter release button of the operating unit 112 in the omni-focus image/blur-enhanced image shooting mode enters the S1-on signal into the CPU 110, the CPU performs auto-focus control (AF) before the focus bracketing (step S10).

More specifically, the CPU 110, while actuating the focusing lens 120b by controlling the focusing lens driver 116, makes the image sensor 124 capture optical images through the image sensor driver 118 at respective AF detection points. The integrator 138 calculates an AF evaluation value (e.g. an output value of a band-pass filter) based on the output signal, and the CPU 110 determines a lens position local maximizing the AF evaluation value as an in-focus position.

The CPU 110 sets a plurality of focus positions which are to be set at the focus bracketing such that the focus positions include the in-focus position calculated in the step S10 (step S12). When the omni-focus processing is performed in the step S22 which will be described later, a focus position is set such that every object becomes in-focus in at least any one of the images. At this time, it is more effective that the focus position is changed according to the aperture, focal length or the like at shooting.

Next, the focus bracketing is performed at the focus position determined in the step S12 (steps S14 to S18). First, the CPU 110 actuates the focusing lens 120b to a desired focus position among the plurality of focus positions determined in the step S12 through the focusing lens driver 116 (step S14), and controls the image sensor 124 through the image sensor driver 118 to capture the object image (step S16). The image captured in the step S16 is temporarily stored in the main memory 132 through the memory controller 130.

The CPU 110 judges whether or not shooting is performed at all of the focus positions determined in the step S12, more specifically, whether or not the processing in the steps S14 and S16 is performed at all of the focus positions determined in the S12 (step S18).

When the processing in the steps S14 and S16 is performed at not all of the plurality of focus positions determined in the step S12 (step S18: NO), the focusing lens 120b is actuated to another focus position (step S14) and the object image at the focus position is captured (step S16).

When the processing in the steps S14 and S16 is performed at all of the plurality of focus positions determined in the step S12 (step S18: YES), the CPU 110 terminates the focus bracketing. Image numbers each indicating which position in a sequence the image acquired by the focus bracketing (hereinafter referred to as focus-bracketed image) is disposed when the focus-bracketed images are arranged with respect to the focus positions are assigned to respective focus-bracketed images. For instance, the image number of the image whose focus position is located most NEAR (nearest) concerning the focus position is set to 0 (0th image), and the image number of the most FAR (farthest) image is assigned to N−1 (N−1th image). Here, N indicates the number of images (image count) acquired by the focus bracketing. If, for instance, N is 5, the image number of the most FAR image is 4.

Figure 3:
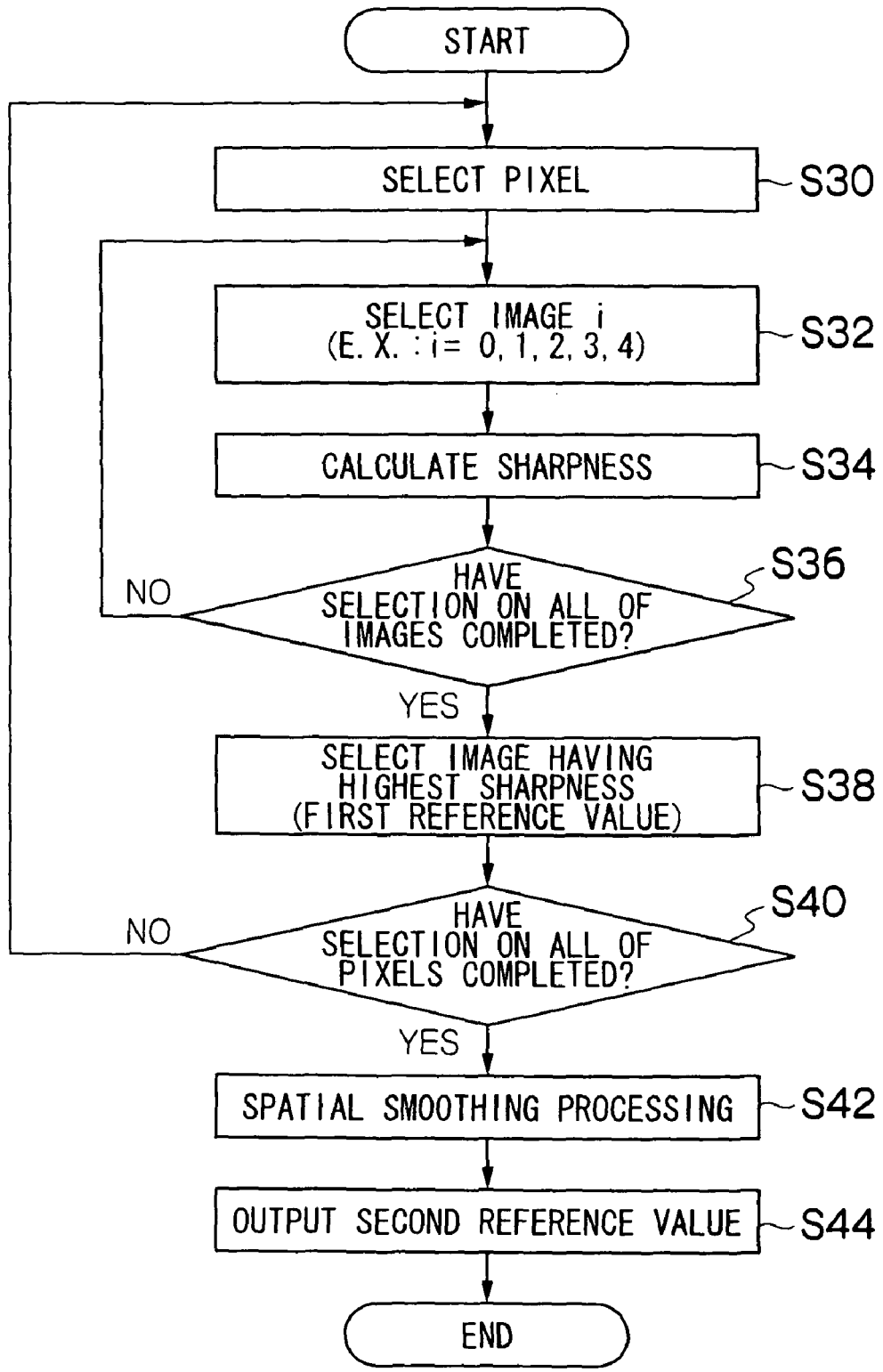
FIG. 3 is a flowchart showing the entire processing flow of a reference value calculation processing (step S20)

After the focus bracketing (steps S14 to S18) is completed, the CPU 110 determines the reference value based on the focus-bracketed images (step S20). FIG. 3 is a flowchart showing a flow of the processing of calculating the first reference value (step S20).

First, the CPU 110 inputs the image stored in the main memory 132 into the reference value calculating unit 160, and the reference value calculating unit 160 selects a target pixel in the inputted image (step S30). For instance, the reference value calculating unit 160 establishes on the image xy coordinates where the origin is at the upper left of the image, the horizontal direction is x direction and the vertical direction is y direction, and selects the target pixel by designating the position of the target pixel using the xy coordinates.

The reference value calculating unit 160 selects an i-th image from among the focus-bracketed images (hereinafter referred to as the image i) (step S32). If the number of focus-bracketed images is five, i is any one of 0 to 4.

The sharpness of the target pixel selected in the step S30 is calculated on the image i selected in the step S32 (step S34). The calculation of the sharpness is performed using a filter such as Laplacian filter shown in FIG. 4. Since output values of the Laplacian filter include positive and negative values, the absolute value of the result acquired by applying the Laplacian filter to the target pixel is used as the sharpness. If the sharpness is high, the possibility that the object corresponding to the pixel is in-focus is high. The Laplacian filter is not limited to this example. Another sharpness calculation filter other than the Laplacian filter may be used.

The reference value calculating unit 160 judges whether or not the sharpness calculation processing shown in the step S34 is performed on all of the inputted focus-bracketed images (step S36). When the sharpness calculation processing shown in the step S34 is performed on not all of the inputted focus-bracketed images (step S36: NO), the reference value calculating unit 160 selects another image from among the focus-bracketed images (step S32), and calculates the sharpness of the target pixel (step S34).

When the sharpness calculation processing shown in the step S34 is performed on all of the inputted focus-bracketed images (step S36: YES), the image number of an image whose sharpness is the highest among the sharpness calculated in step S34 is outputted as the first reference value on the target pixel (step S38). For instance, the number of focus-bracketed images is five, the first reference value is typically one of five gradations of 0 to 4. It should be noted that, in this case, for the convenience of comparison with the later part (steps S42 and S44), the value of the five gradations of 0 to 4 is multiplied by 255/4 and then integerized, and normalized to be one of values of 0 to 255. The normalized value is determined as the first reference value. It should be noted that the number of gradations is still five (0, 64, 128, 191, 255).

The reference value calculating unit 160 judges whether or not the above-mentioned processing is performed on all of the pixels, in other words, the respective first reference values on all of the pixels are outputted (step S40). When the first reference values on all of the pixels are not outputted (step S40: NO), the reference value calculating unit 160 selects another target pixel (step S30), and outputs the first reference value on the target pixel (steps S32 to S38).

When the first reference values on all of the pixels are outputted (step S40: YES), the reference value calculating unit 160, as the result, creates a map of a frame (see FIG. 5) showing a spatial distribution of the first reference values by arranging the first reference values, which have been calculated on a pixel basis, in the respective positions of the pixels. The CPU 110 temporarily stores the map created by the reference value calculating unit 160 in the main memory 132 through the memory controller 130. The CPU 110 inputs the map stored in the main memory 132 into reference value smoothing unit 162. The reference value smoothing unit 162 performs the spatial smoothing processing on the map and acquires a spatially smoothed map (step S42).

The spatial smoothing processing is performed by applying a smoothing filter, for instance, shown in FIG. 6, to the map shown in FIG. 5. FIG. 6 shows only an element of the smoothing filter. Since the sum total is 16 in FIG. 16, the spatially smoothed map as shown in FIG. 7 is acquired by calculating a sum of products of the coefficients of the smoothing filter shown in FIG. 6 and the respective values in the map shown in FIG. 5, and by dividing the sum of products by 16.

Comparing FIG. 5 and FIG. 7 with each other, it is understood that the reference values after the smoothing shown in FIG. 7 are generated by gradually and spatially smoothing the first reference values shown in FIG. 5. More specifically, the second reference value holds more than five gradations because of the smoothing. Thus, smoothness along the gradational direction for the reference values is acquired. Furthermore, the smoothing reduces micro-variations due to noises, thereby acquiring smoothness along the spatial directions.

The reference value smoothing unit 162 uses the reference values after the smoothing as second reference values, and outputs to the CPU 110 the map of the second reference values, i.e. range image representing an in-focus distribution (step S44).

Thus, the processing of determining the reference values based on the focus-bracketed images (step S20) is completed. The CPU 110 temporarily stores the range image acquired by the reference value calculating unit 160 in the main memory 132 through the memory controller 130.

Next, based on the second reference values stored in the main memory 132, the omni-focus processor 164 performs the omni-focus processing, and the blur enhancement processor 166 performs the blur enhancement processing (step S22).

Figure 8:
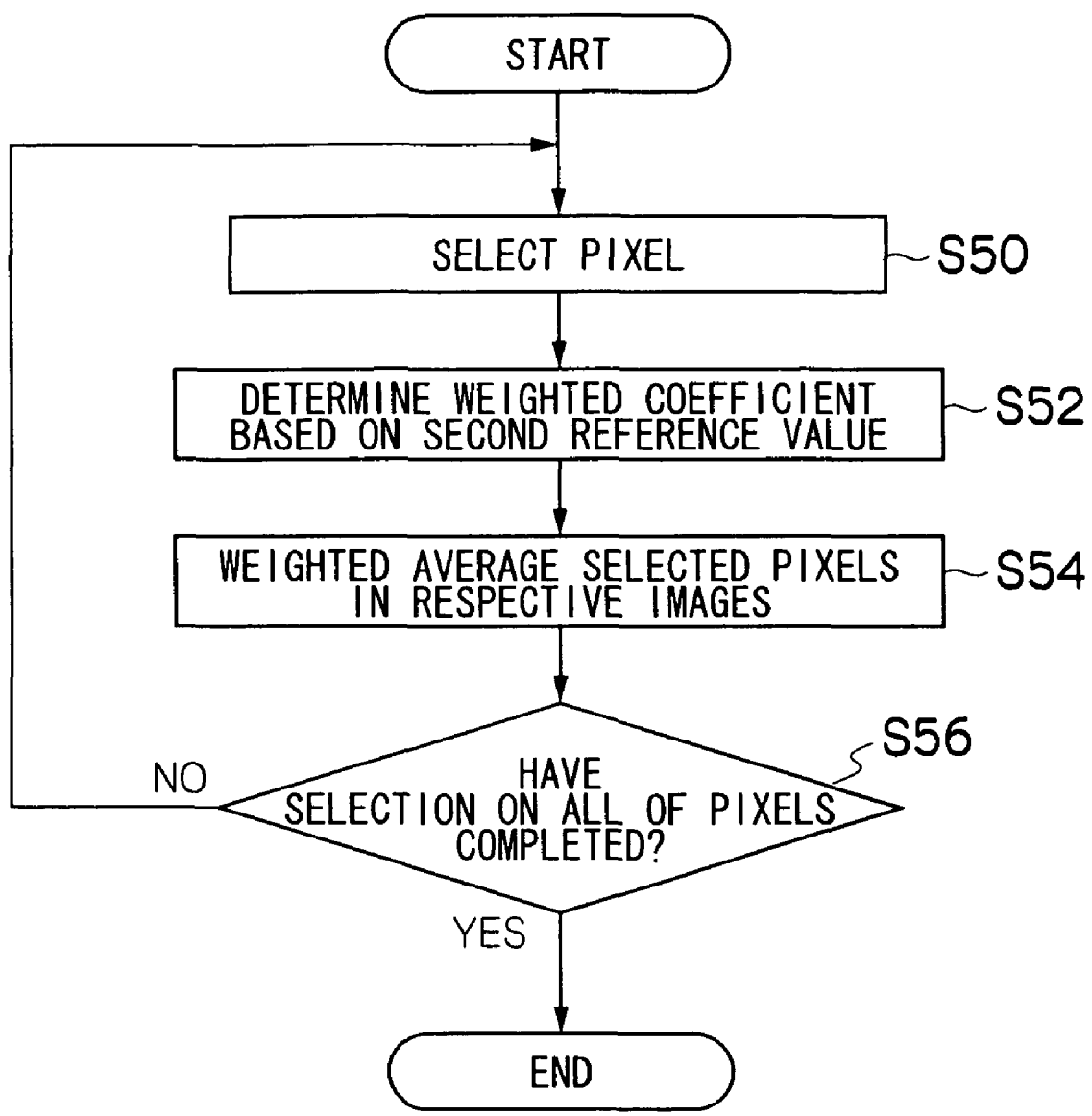
FIG. 8 is a flowchart showing a processing flow of omni-focus processing (step S22)

FIG. 8 is a flowchart showing processing flow where the omni-focus processor 164 performs the omni-focus processing.

First, the omni-focus processor 164 selects the desired pixel (step S50), and determines a weighted coefficient on the selected pixel, in other words, it is determined which image is weighted-averaged in which ratio (step S52). More specifically, the omni-focus processor 164 refers to the map stored in the main memory 132, and acquires the second reference value on the pixel selected in the step S50, multiplies the acquired second reference value by 4/255 to return the value to a range of 0 to 4, and uses the returned value as the weighted coefficient.

The focus-bracketed images are weighted-averaged with respect to the pixel selected in the step S52 on the basis of the weighted coefficient determined in the step S52 (step S54). For instance, the weighted coefficient determined in the step S52 is 1.5, the image 1 and the image 2 are weighted-averaged in a ratio of 0.5 to 0.5. The weighted coefficient determined in the step S52 is 2.8, the image 2 and the image 3 are weighted-averaged in a ratio of 0.2 to 0.8.

The omni-focus processor 164 judges whether or not the weighted-averaging of the focus bracket images is performed with respect to all of the pixels (step S56). When the weighted-averaging of the focus-bracketed images is performed with respect to not all of the pixels (step S56: NO), the omni-focus processor 164 selects another pixel (step S50), determines the weighted coefficient (step S52), and weighted-averages the focus-bracketed images (step S54).

When the weighted-averaging of the focus-bracketed images is performed with respect to all of the pixels (step S56: YES), the omni-focus processing is completed. Thus, the omni-focus image where every part of the image is in focus is generated. Here, "to generate an omni-focus image where every part of the image is in focus" means to generate a synthesized image by combining parts where focus is obtained (in-focus parts) in respective images acquired by the image acquiring device. It is not required, in this embodiment, to take the focus in parts where focus is not obtained (out-of-focus parts) in all of the plurality of acquired images. That is, when a part A is out of focus in all of the images, the part A remains out of focus even though the omni-focus processing has been performed.

Figure 9:
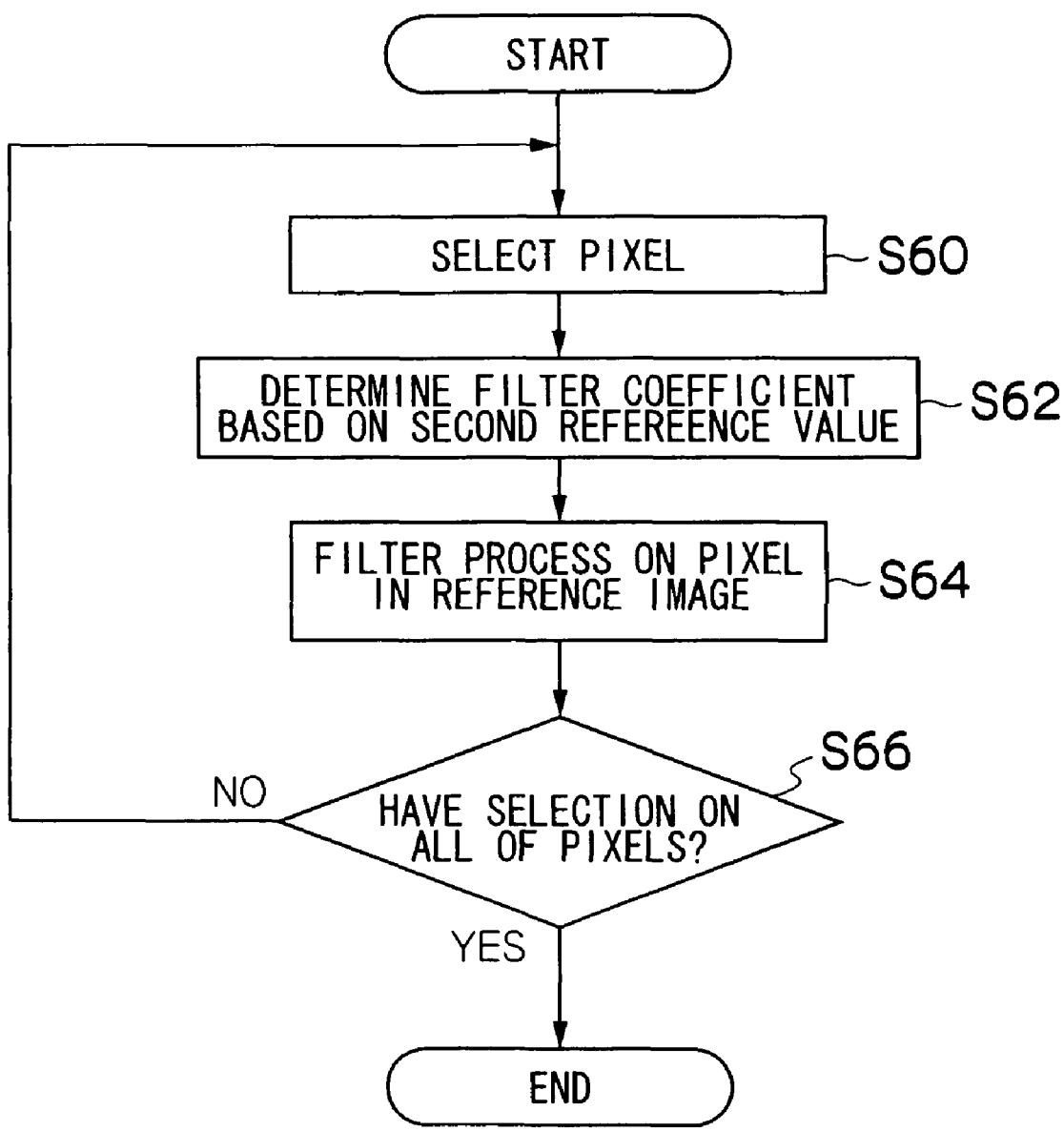
FIG. 9 is a flowchart showing a processing flow of blur enhancement processing (step S22)

FIG. 9 is a flowchart showing processing flow where the blur enhancement processor 166 performs the blur enhancement processing.

First, the blur enhancement processor 166 selects a desired pixel (step S60), and determines a filter coefficient for blurring with respect to the selected pixel (step S62). More specifically, the blur enhancement processor 166 refers to the map stored in the main memory 132 and acquires the second reference value on the pixel selected in the step S60, multiplies the acquired second reference value by 4/255 to return the value to a range of 0 to 4, and determines the filter coefficient for blurring a (see Formula 1) according to the difference between the value obtained from the second reference value by returning to the range of 0 to 4 and the image number of the image (hereinafter referred to as reference image) captured at the in-focus position determined in the step S10 from among the focus-bracketed images captured in step S16.

$$\sigma = |(\text{the value obtained from the second reference value by returning to a range of 0 to 4}) - (\text{the image number of the reference image})| \quad [\text{Formula 1}]$$

When, for instance, the image number of the reference image from among the five focus-bracketed images is 2 and the filer coefficient for blurring determined in the step S62 is 1.4, a Gaussian filter having characteristics of $\sigma=0.6$ is used as the coefficient of the filter for blurring. When the image number of the reference image is 2 and the filer coefficient for blurring determined in the step S62 is 3.5, a Gaussian filter having characteristics of $\sigma=1.5$ is used as the coefficient of the filter for blurring.

Figure 10:
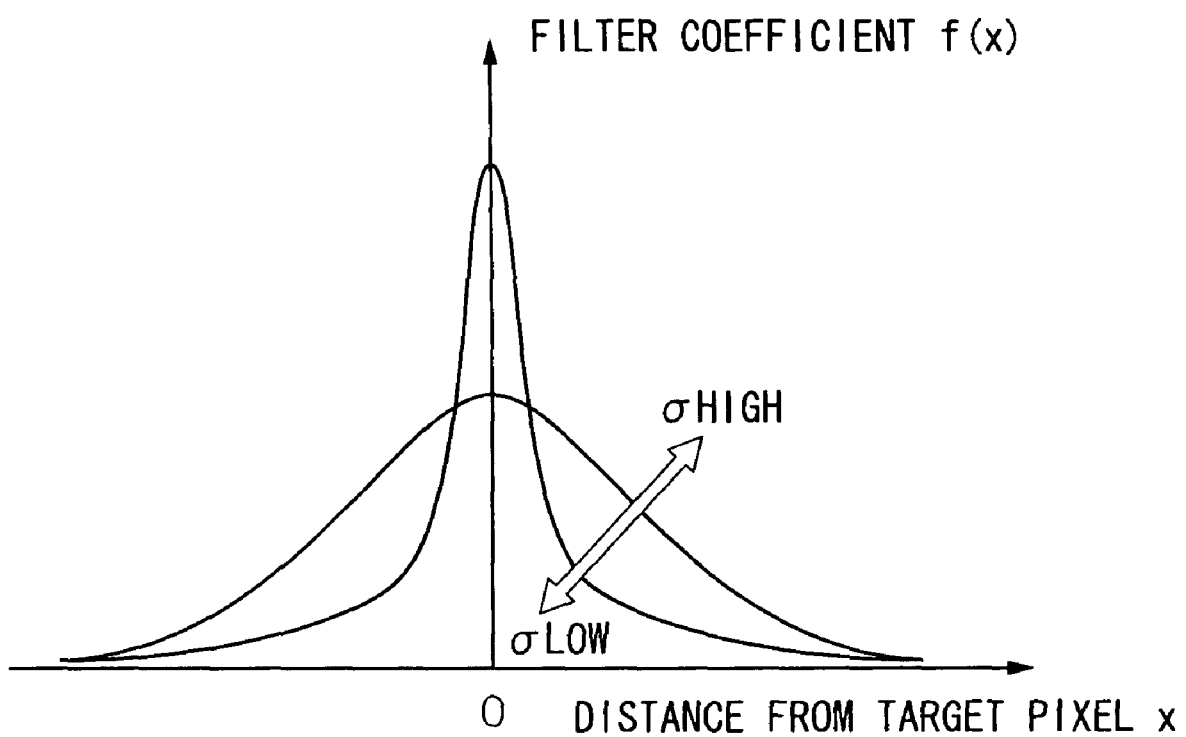
FIG. 10 shows an example of a Gaussian filter used for the blur enhancement processing.

The Gaussian filter is a low-pass filter having filter coefficients, for example, as shown in FIG. 10, and has characteristics that the larger the filter coefficient $\sigma$ becomes, the larger the blurring amount becomes. The filter coefficient $\sigma$ is not limited to this example. Instead, a value which is acquired using Formula 1 can be multiplied by a certain constant in accordance with the blurring amount of real shooting may be used.

Using the Gaussian filter having the characteristics of the filter coefficient of a calculated in the step S62, the filtering processing is performed on the pixel selected in the step S60 in the reference image (step S64). Thus, blurring degrees can be varied on a pixel basis according to the respective second reference values.

The blur enhancement processor 166 judges whether the filtering processing is performed on all of the pixels (step S66). When the filtering processing is performed not all of the pixels (step S66: NO), the blur enhancement processor 166 selects another pixel (step S60), determines the filter coefficient a (step S62), and performs the filtering processing on the selected pixel (step S64).

When the filtering processing is performed on all of the pixels (step 66: YES), the blur enhancement processing is completed. Thus, the blur-enhanced image is generated.

Thus, the step of performing the omni-focus processing or the blur enhancement processing (step S22) is completed. The CPU 110 supplies the omni-focus image and the blur-enhanced image generated in the step S22 to the compression/decompression processor 136. The omni-focus image and the blur-enhanced image are compressed according to a prescribed compression format (e.g. JPEG system) by the compression/decompression processor 136 and then stored in the memory 132. The stored data is subsequently converted into an image file of a prescribed image recording format (e.g. Exif system) and then recorded onto the recording medium 142 via the memory controller 140 (step S24).

According to this exemplary embodiment, smoothing of the image number of the image whose sharpness is highest allows an in-focus judgment that is more precise and smooth in transition to be acquired. The smoothing relaxes the effect of the noise. Accordingly, reference to the result of the in-focus judgment based on the smoothed reference values allows more natural omni-focus processing and blur enhancement processing to be performed.

According to this exemplary embodiment, in the step of calculating the reference value (step S20), the map of a frame representing the spatial distribution of the first reference values is created by arranging the first reference values calculated on a pixel basis in the respective positions of the pixels, and the spatial smoothing processing is applied to the map (step S42). However, it is unnecessary to create a map on all of the pixels. Instead, it is effective to hold a map at least supporting the number of taps of the spatial smoothing filter. When, for instance, the processing is performed using a filter of 3×3, the spatial smoothing processing can be performed using a memory of 3×3 instead of creating the map on all of the pixels.

Figure 11:
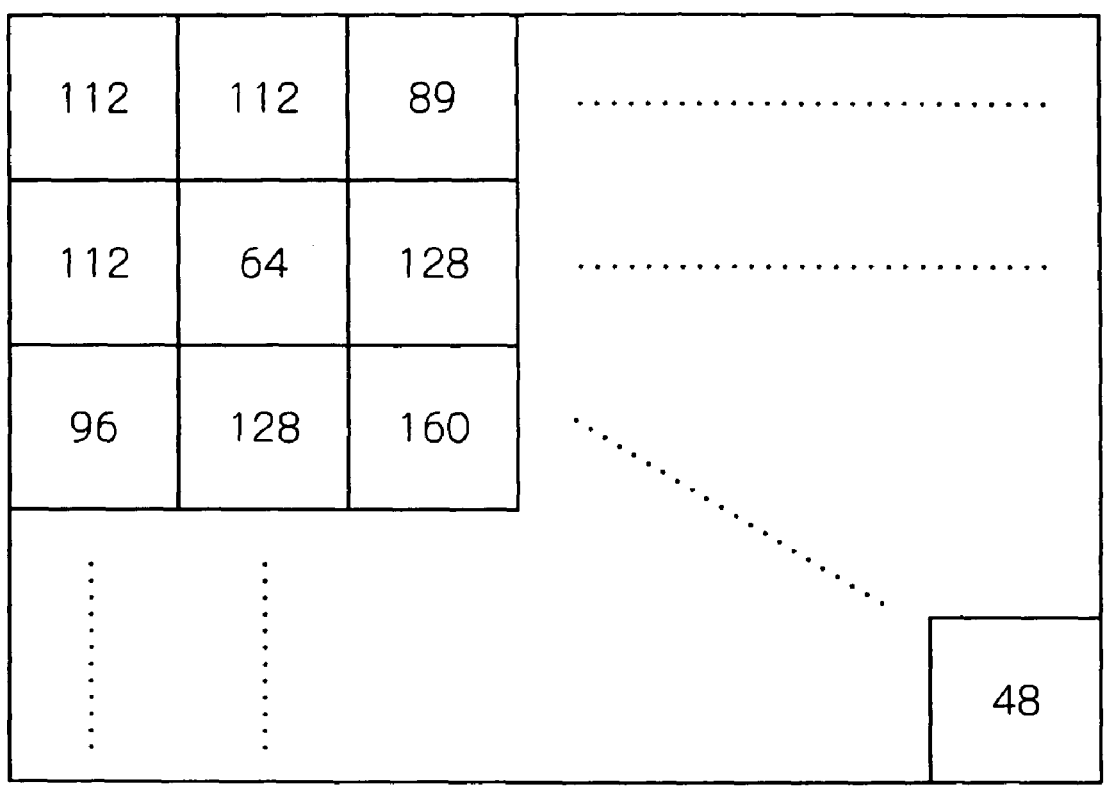
FIG. 11 is an example of a low resolution map averaged over adjacent four pixels of 2×2, in the map of the second reference values.

According to this exemplary embodiment, in the step of calculating the reference value (step S20), the map having the same resolution as that of the focus-bracketed images is created (step S42). It is unnecessary that the map has the same resolution as that of the image. Instead, for instance, a low resolution map averaged over adjacent four pixels of 2×2 can be used as shown in FIG. 11. This allows not only saving of memory space for mapping but also speed improvement of the spatial smoothing processing. In this case, it is necessary to refer to the reference value corresponding to the coordinates of the original image from the low resolution map in the omni-focus processing or blur enhancement processing (step S22).

According to this exemplary embodiment, in the setting of the focus position at the focus bracketing (step S12), the plurality of positions are set so as to include the in-focus position calculated in the step S10. Instead, the focus position at focus bracketing may be set so as not to include the in-focus position.

According to this exemplary embodiment, the omni-focus processing and the blur enhancement processing are performed in the omni-focus processing/blur enhancement processing (step S22). It is unnecessary to perform both of processing. It is also effective that only one of the omni-focus processing and the blur enhancement processing is performed.

According to this exemplary embodiment, the image captured at the in-focus position is used as the reference image in the blur enhancement processing (steps S62 and S64). Instead, the image which a user arbitrary sets may be used as the reference image.

Meanwhile, when a camera-to-subject distance is very short, it is possible that the focus is not obtained in any parts in any of the plurality of images (focus-bracketed images). In this case, even though focus is not obtained, parts in which better focus on the subject is obtained in respective images can be selected based on the second reference values and the selected parts are combined to obtain a synthesized image. Further, the focus-bracketed images can be weight-averaged based on the second reference values to obtain an omni-focus so that the omni-focus image comes into as near focus as possible.

<Second Exemplary Embodiment>

Since the image number whose sharpness is the highest is used as the first reference value according to the first exemplary embodiment, the same result is acquired irrespective of the level of sharpness provided that the sharpness is the highest. For instance, in the changing point of the edge shown in FIG. 18, the sharpness of the image 1 is 8. However, even if the sharpness is 16 or 1, the sharpness of the image 1 is still highest when being compared with the sharpness of the image 2.

However, in an actual image, the stronger the edge is, the higher the possibility of in-focus near the pixel is. Therefore, in order to perform more precise in-focus judgment, it is better to perform spatial smoothing in consideration of the level of sharpness.

According to a second exemplary embodiment, spatial smoothing is performed in consideration of the level of the sharpness by representing the first reference value as a two dimensional vector (sharpness vector) including the image number whose sharpness is highest and the sharpness, instead of a scalar quantity of the image number whose sharpness is highest. Hereinafter, the second exemplary embodiment will be described. Identical parts to those of the first exemplary embodiment will be denoted by the identical reference symbols, and the description thereof will be omitted.

Figure 12:
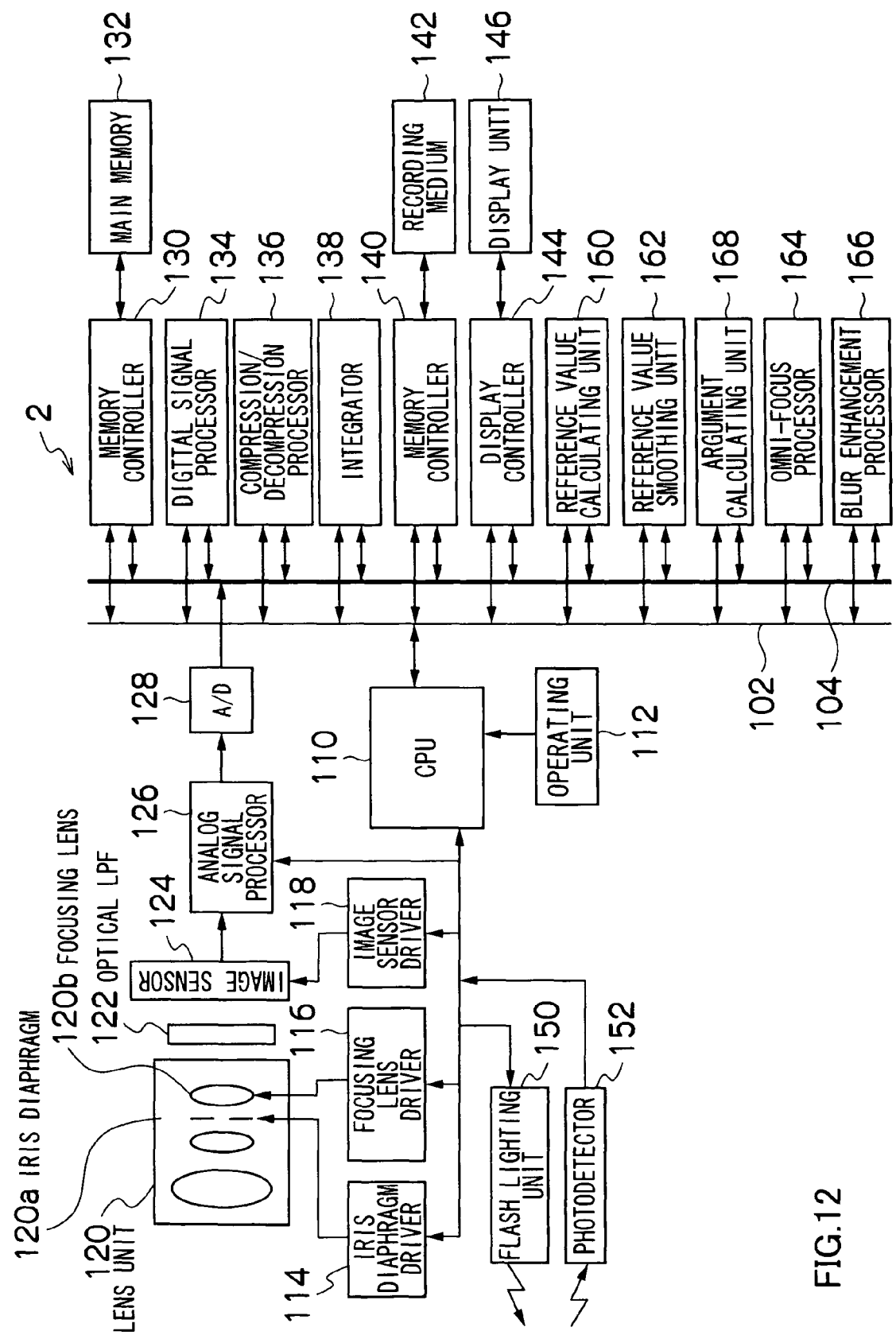
FIG. 12 is a block diagram schematically showing the internal configuration of a digital camera 2 to which the present invention is applied according to the second exemplary embodiment.

FIG. 12 is a block diagram schematically showing the internal configuration of a digital camera 2 according to the second exemplary embodiment.

As shown in the figure, the digital camera 2 principally includes a CPU 110, an operating unit (a shutter release button, a power/mode-selector switch, a mode selector dial, a zooming button, a cross button, a menu/OK button, a DISP button, BACK button etc.) 112, an iris diaphragm driver 114, a focusing lens driver 116, an image sensor driver 118, a lens unit 120, an optical low-pass filter (LPF) 122, an image sensor 124, an analog signal processor (CDS/AMP) 126, an A/D convertor 128, a memory controller 130, a main memory 132, a digital signal processor 134, a compression/decompression processor 136, an integrator 138, a memory controller 140, a recording medium 142, a display controller 144, a display unit 146, a flash lighting unit 150, a photodetector 152, a reference value calculating unit 160, a reference value smoothing unit 162, an omni-focus processor 164, a blur enhancement processor 166, and an argument calculating unit 168.

The argument calculating unit 168 calculates an argument of a sharpness vector represented in polar coordinate system. Calculation method of the sharpness vector and the argument will be described later in detail.

Figure 13:
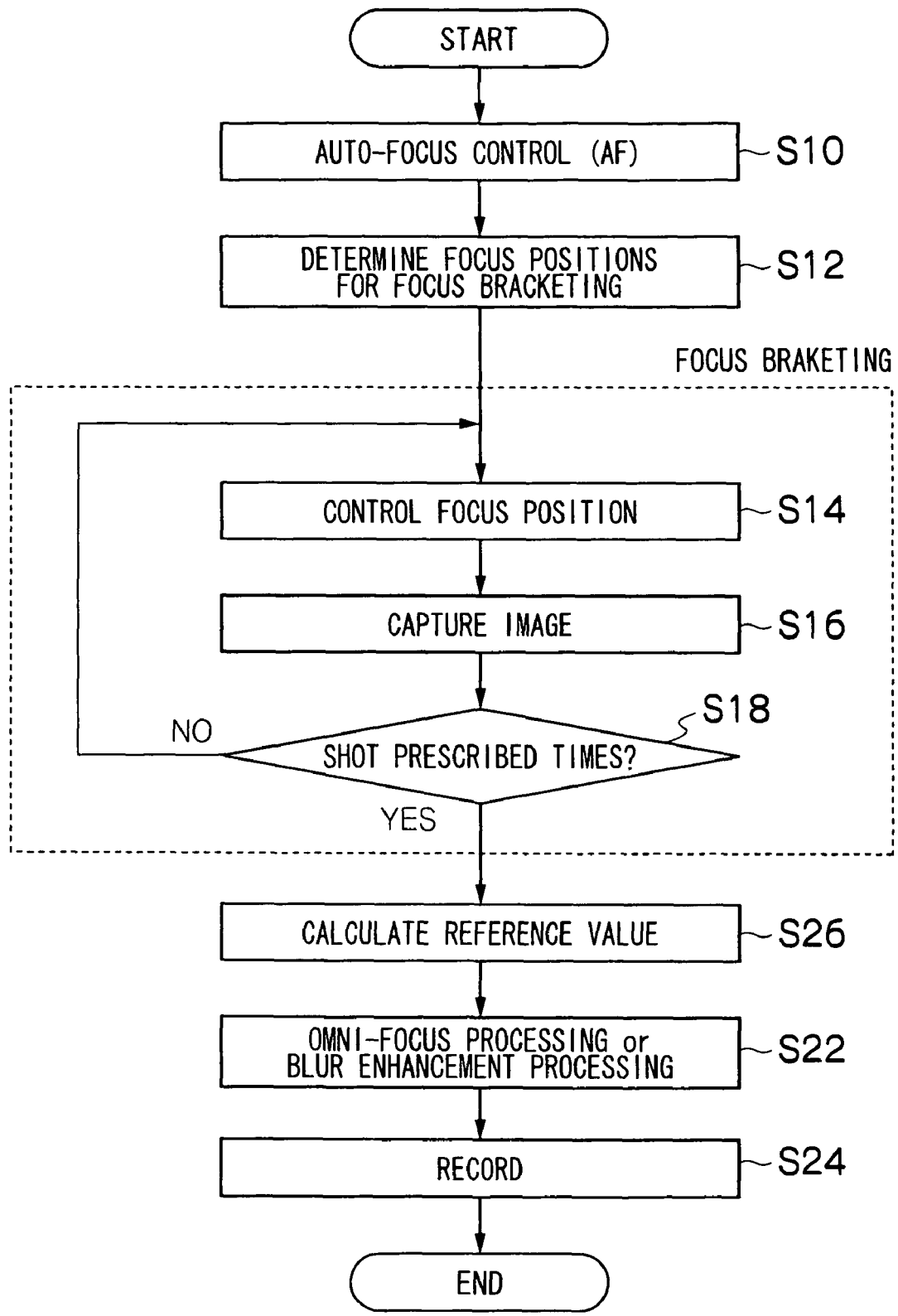
FIG. 13 is a flowchart showing the entire processing flow in the omni-focus image/blur-enhanced image shooting mode of the second digital camera 2.

The operation of the digital camera 2 according to this exemplary embodiment configured as described above will be described. Since the ordinary shooting processing is identical to that of the first exemplary embodiment, the shooting processing of the omni-focus image or the blur-enhanced image will be described. FIG. 13 is a flowchart showing the entire processing flow for shooting the omni-focus image or the blur-enhanced image in the omni-focus image/the blur-enhanced image shooting mode.

When a half pressing of the shutter release button of the operating unit 112 in the omni-focus image/blur-enhanced image shooting mode enters the SI-ON signal into the CPU 110, the CPU 110 performs auto-focus control (AF) before the focus bracketing (step S10), and sets a plurality of focus positions which are to be set at the focus bracketing such that the focus positions include the in-focus position calculated in the step S10 (step S12).

Next, the focus bracketing is performed at the focus position determined in the step S12 (steps S14 to S18). First, the CPU 110 actuates the focusing lens 120b to a desired focus position among the plurality of focus positions determined in the step S12 through the focusing lens driver 116 (step S14), and controls the image sensor 124 through the image sensor driver 118 to capture the object image (step S16). The image captured in the step S16 is temporarily stored in the main memory 132 through the memory controller 130.

The CPU 110 judges whether or not shooting is performed at all of the focus positions determined in the step S12, more specifically, whether or not the processing in the steps S14 and S16 is performed at all of the focus positions determined in the S12 (step S18).

When the processing in the steps S14 and S16 is performed at not all of the plurality of focus positions determined in the step S12 (step S18: NO), the focusing lens 120b is actuated to another focus position (step S14) and the object image at the focus position is captured (step S16).

Figure 14:
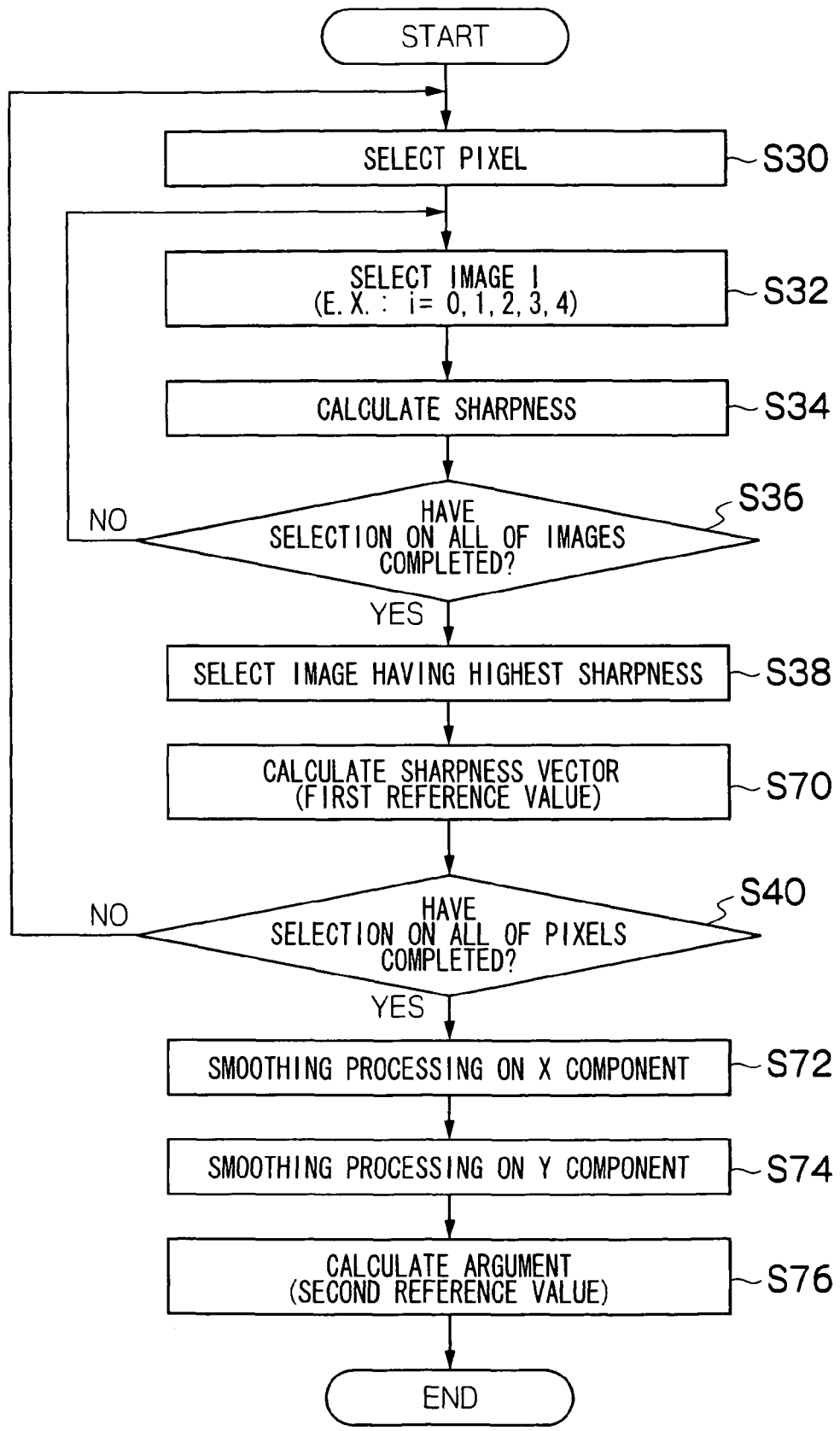
FIG. 14 is a flowchart showing a processing flow of calculating the reference value (step S26)

When the processing in the steps S14 and S16 is performed at all of the plurality of focus positions determined in the step S12 (step S18:YES), the CPU 110 terminates the focus bracketing, and determines the reference value based on the focus-bracketed images (step S26). FIG. 14 is a flowchart showing a processing flow of calculating the reference value (step S26).

First, the CPU 110 inputs the image stored in the main memory 132 into the reference value calculating unit 160, and the reference value calculating unit 160, for instance, selects a target pixel in the inputted image by establishing on the image xy coordinates where the origin is at the upper left of the image, the horizontal direction is x direction and the vertical direction is y direction, and designating the position of the target pixel using the xy coordinates (step S30). The image i is selected from among the focus-bracketed images (step S32). The sharpness of the target pixel selected in the step S30 is calculated on the image i selected in the step S32 (step S34).

The reference value calculating unit 160 judges whether or not the sharpness calculation processing shown in the step S34 is performed on all of the inputted focus-bracketed images (step S36). When the sharpness calculation processing shown in the step S34 is performed on not all of the inputted focus-bracketed images (step S36: NO), the reference value calculating unit 160 selects another image from among the focus-bracketed images (step S32), and calculates the sharpness of the target pixel (step S34).

When the sharpness calculation processing shown in the step S34 is performed on all of the inputted focus-bracketed images (step S36:YES), the image number of an image whose sharpness is the highest among the sharpness calculated in step S34 is selected (step S38), a sharpness vector is acquired based on the image number and the sharpness, and outputted as the first reference value (step S70).

Figure 15:
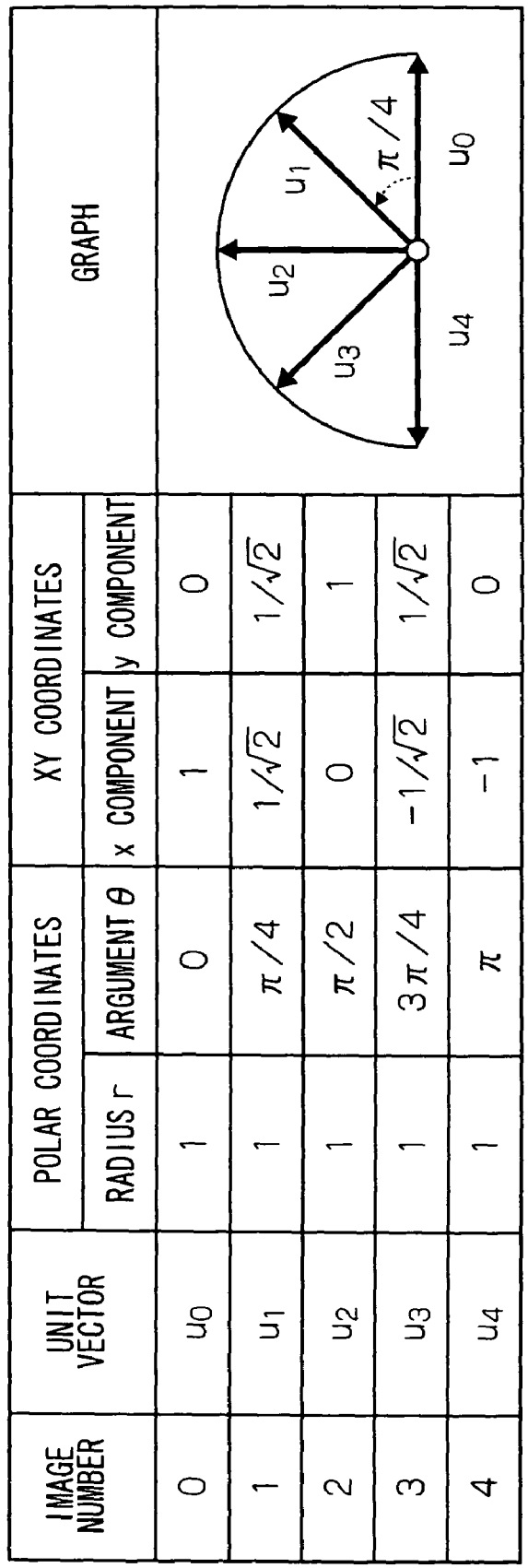
FIG. 15 shows a unit vector of a sharpness vector when the number of focus-bracketed images is five.

When, for instance, the number of focus-bracketed images (image count) is five, unit vectors $u_0$ to $u_4$ corresponding to the respective image numbers of 0 to 4 are preliminarily prepared, as shown in FIG. 15. In the polar coordinates representation, the radius r of each of the unit vectors $u_0$ to $u_4$ is 1, the argument $\theta$ of the unit vector $u_0$ of the most NEAR image (image 0) is $\pi$ [rad], the argument $\theta$ of the unit vector $u_4$ of the most FAR image (image 4) is $\pi$ [rad], and the arguments $\theta$ of the unit vectors $u_1$, to $u_3$ of the images (images 1 to 3) between these two images are values equally dividing a range from 0 to $\pi$ [rad], more specifically, the argument $\theta$ of the unit vector $u_1$ of the image 1 is $\pi/4$ [rad], the argument $\theta$ of the unit vector $u_2$ of the image 2 is $\pi/2$ [rad], and the argument $\theta$ of the unit vector $u_3$ of the image 3 is $3\pi/4$ [rad].

The sharpness vector is the unit vector where the sharpness is assigned as the radius of the unit vector. For instance, if the sharpness of the image 1 is 8, which is highest among all of the images, on a certain pixel, the sharpness vector is a vector where the radius r is 8 and the argument $\theta$ is $\pi/4$ [rad].

The sharpness vector of each pixel acquired as described above is converted into a sharpness vector in the xy coordinates representation from that in the polar coordinates representation and outputted as the first reference value in order to perform the after-mentioned spatial smoothing processing (steps S72 to S74, which will be described later in detail). For instance, the first reference value of the sharpness vector where the radius r is 8 and the argument $\theta$ is $\pi/4$ [rad] is (x, y)=($8/\sqrt{2}$, $8/\sqrt{2}$).

The reference value calculating unit 160 judges whether or not the above-mentioned processing is performed on all of the pixels, in other words, the respective first reference values on all of the pixels are outputted (step S40). When the first reference values on all of the pixels are not outputted (step S40: NO), the reference value calculating unit 160 selects another target pixel (step S30), and outputs the first reference value on the target pixel (steps S32 to S70).

When the first reference values on all of the pixels are outputted (step S40: YES), the reference value calculating unit 160, as the result, creates maps corresponding to two frames. The maps represent spatial distributions of the x component and y component, respectively. The CPU 110 temporarily stores the maps created by the reference value calculating unit 160 in the main memory 132 through the memory controller 130. The CPU 110 inputs the maps stored in the main memory 132 into reference value smoothing unit 162. The reference value smoothing unit 162 performs the spatial smoothing processing on the map of the x component according to an method almost identical to that of the first exemplary embodiment (step S72), and performs the spatial smoothing processing on the map of the y component according to an method almost identical to that of the first exemplary embodiment (step S74).

Figure 16:
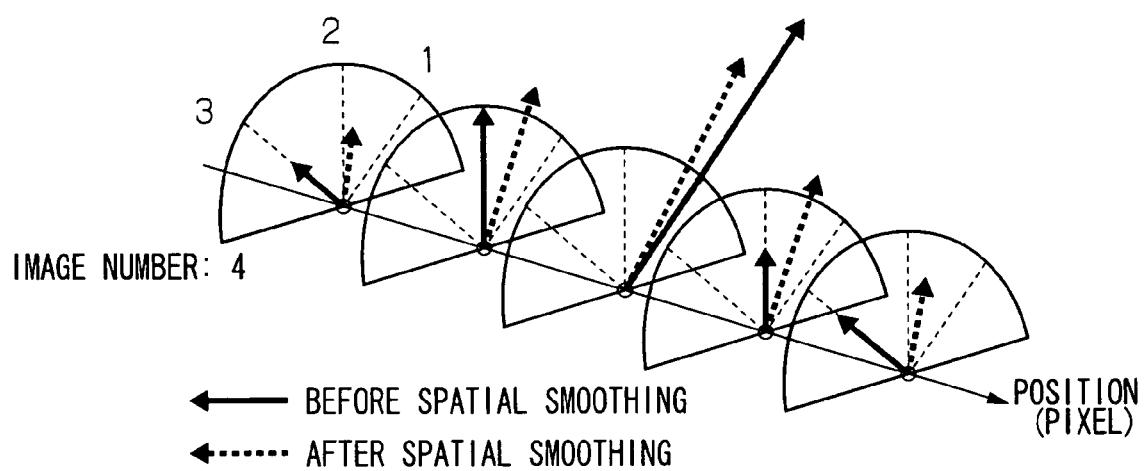
FIG. 16 shows a concept of spatial smoothing on the sharpness vector.
Figure 17:
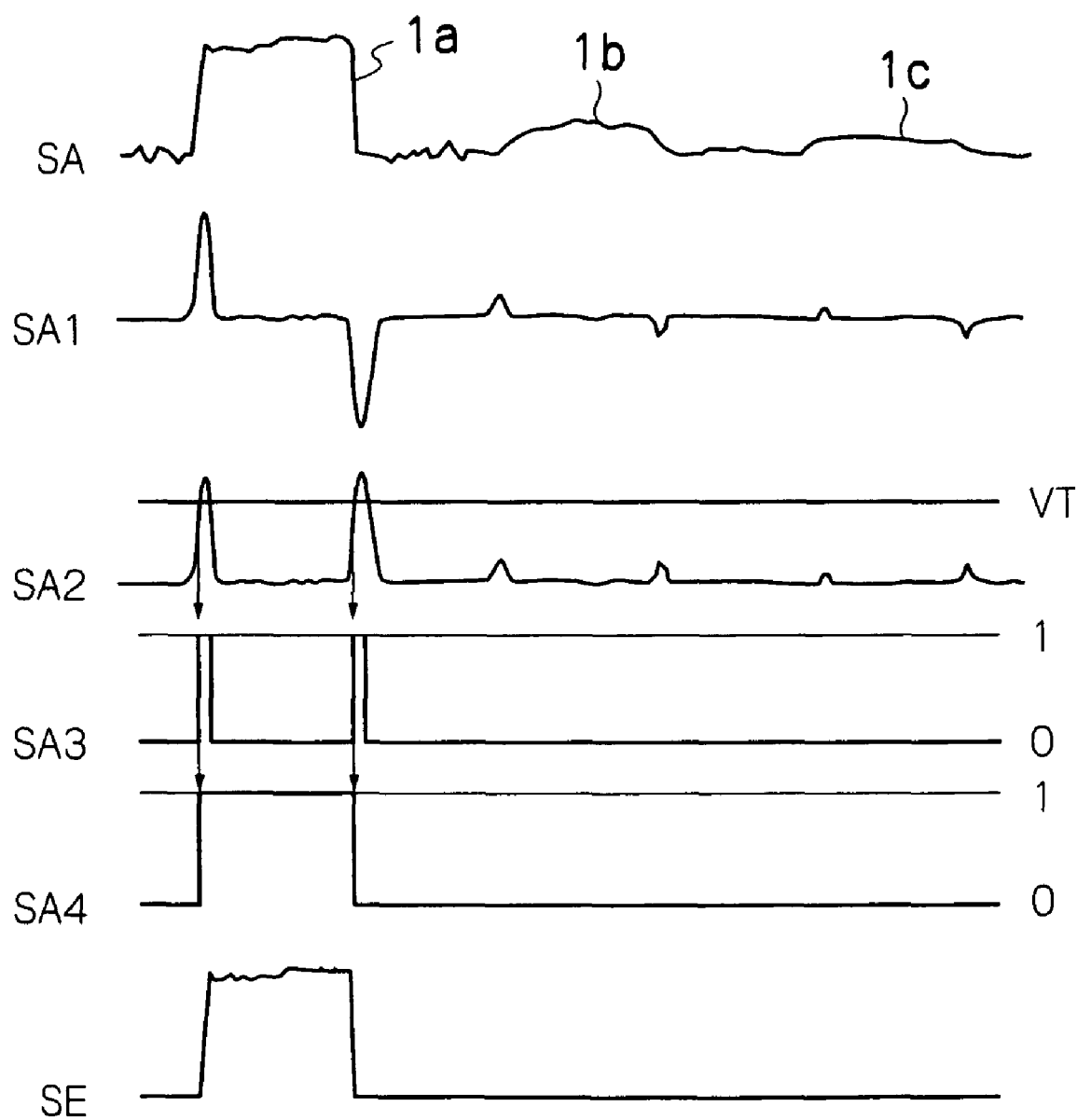
FIG. 17 illustrates a conventional method of acquiring an in-focus judgment region.

FIG. 16 shows an example of the sharpness vector which has been returned from the xy coordinates representation to the representation in the polar coordinates after respective executions of the spatial smoothing processing on the x component and the y component. As shown in FIG. 16, the direction (argument) of the sharpness vector after the spatial smoothing on a pixel basis approaches the direction (argument) of a proximate vector having a long radius under the effect of the long vector. This allows smooth transition between the sharpness vectors.

The maps of sharpness vectors (the maps of x component and y component after the spatial smoothing processing) to which the spatial smoothing processing are thus applied is stored again in the main memory 132 through the memory controller 130, and inputted into the argument calculating unit 168. The argument calculating unit 168 calculates the argument $\theta$ from the inputted map based on Formula 2. In Formula 2, x and y are the x and y components of the smoothed sharpness vector, respectively.

$$\theta = \arctan\left(\frac{y}{x}\right) \quad \text{[Formula 2]}$$

Since the argument $\theta$ is a scale corresponding to the image number, the calculated argument becomes the second reference value. Multiplication of the acquired argument by $4/\pi$ returns the argument $\theta$ to values in a range of 0 to 4 (the number of images), thereby acquiring a map of a plurality of gradation levels of the second reference values, i.e. a range image representing an in-focus distribution, as with the first exemplary embodiment (step S76).

Thus, the processing of determining the reference value from the focus-bracketed images (step S26) is completed. The CPU 110 temporarily stores the range image calculated by the argument calculating unit 168 in the main memory 132 through the memory controller 130.

Next, the omni-focus processor 164 performs the omni-focus processing and the blur enhancement processor 166 performs the blur enhancement processing based on the second reference values stored on the main memory 132 (step S22). The CPU 110 records the omni-focus image and the blur-enhanced image generated in the step S22 onto the recording medium 142 through the memory controller 140 (step S24).

This exemplary embodiment attaches the great importance not only to the image number whose sharpness is highest but also to the level of sharpness, or the effect of the sharp edge, thereby allowing a more precise range image to be acquired. This allows the omni-focus image synthesized based on the range image to be more smooth and natural. In addition, since more precise in-focus judgment result can be acquired, the blur-enhanced image having more precise blurring amount can be generated.

Application of the present invention is not limited to the digital camera. Instead, the present invention can be applied to an imaging apparatus such as a camera cellular phone and a video camera, and to an image processing apparatus such as a PC (general purpose computer) which processes images captured by the imaging apparatus. The present invention can also be provided as a program to be applied to an apparatus such as a PC.

What is claimed is:

1. An image processing apparatus, comprising:
   an image acquiring device which acquires a plurality of images consecutively shot while varying a focus position of a lens;
   a sharpness calculating device which calculates a sharpness on each pixel of the plurality of images acquired by the image acquiring device;
   a first reference value calculating device which calculates a first reference value indicating an image of the plurality of images to which a pixel whose the sharpness calculated by the sharpness calculating device is a highest among pixels located on an identical position in the plurality of images belongs, on said each pixel of the images;
   a second reference value calculating device which calculates a second reference value on said each pixel of the images based on the first reference value calculated by the first reference value calculating device by spatially smoothing the first reference value on said each pixel based on the first reference values on adjacent pixels; and
   an image processing device which image-processes at least one of the plurality of images based on the second reference values and generates a blur-enhanced image in which a portion except a principal object is blurred.

2. The image processing apparatus according to claim 1, wherein the second reference value calculating device includes a map generating device which generates a map where the first reference value calculated by the first reference value calculating device on said each pixel of the images is arranged according to a position of said each pixel, and calculates the second reference value by spatially smoothing the map generated by the map generating device.

3. The image processing apparatus according to claim 1, wherein the first reference value includes first information indicating an image of the plurality of images to which the pixel whose the sharpness is the highest belongs and second information indicating a level of the sharpness.

4. The image processing apparatus according to claim 3, wherein the first reference value is represented as a two dimensional vector where the first information comprises an argument and the second information comprises a radius.

5. The image processing apparatus according to claim 4, wherein the second reference value calculating device includes a map generating device which separates the first reference value represented as the two dimensional vector on said each pixel in the image into an x component and a y component and generates maps of the x component and the y component in which the x component and the y component are arranged according to a position of said each pixel, respectively, and spatially smoothes the map of the x component and the y component generated by the map generating device, acquires the argument from the spatially smoothed x component and y component and uses the argument as the second reference value.

6. The image processing apparatus according to claim 2, wherein the map generating device weighted-averages the first reference values in a prescribed area and generates a low resolution map having smaller number of samples than that of the map.

7. The image processing apparatus according to claim 1, further comprising:
   a device which determines a weighted average coefficient on said each pixel on the identical position in the plurality of images based on the second reference value calculated by the second reference value calculating device; and
   a device which generates the an omni-focus image by weighted-averaging the pixels on the identical position in the plurality of images based on the determined weighted average coefficient.

8. The image processing apparatus according to claim 1, further comprising:
   a device which determines a filter coefficient of a blurring filter for adjusting a level of a blurring on each pixel of a reference image from among the plurality of images based on the second reference value calculated by the second reference value calculating device; and
   wherein the image processing device generates the blur-enhanced image by performing a filtering processing on a corresponding pixel in the reference image using the blurring filter that comprises the determined filter coefficient.

9. The image processing apparatus according to claim 1, wherein the image processing device image-processes the plurality of images acquired by the image acquiring device based on the second reference values calculated by the second reference value calculating device to generate an omni-focus image.

10. An imaging apparatus, comprising:
    the image processing apparatus according to claim 1;
    an imaging device which includes an image sensor capturing an object image and an imaging optical system forming the object image on the image sensor; and
    a control device which controls the imaging device so as to form the plurality of images on the image sensor.

11. The image processing apparatus according to claim 1, wherein, in the blur-enhanced image, the principal object is in-focus and the portion except the principal object is blurred beyond an actual depth of field of the lens.

12. An image processing method, comprising:
    acquiring a plurality of images consecutively shot while varying a focus position of a lens;
    calculating a sharpness on each pixel of the acquired plurality of images;
    calculating a first reference value indicating an image of the plurality of images to which a pixel whose the calculated sharpness is a highest among pixels located on identical positions in the plurality of images belongs, on said each pixel of the images;

calculating a second reference value based on the calculated first reference value on said each pixel of the images by spatially smoothing the first reference value on said each pixel based on the first reference values on adjacent pixels; and image-processing at least one of the plurality of images based on the second reference values and generating a blur-enhanced image in which a portion except a principal object is blurred.

13. The image processing method according to claim 12, wherein the image-processing includes processing the plurality of images based on the second reference value to generate an omni-focus image.

14. A non-transitory recording medium on which a program is recorded, the program for making a processor perform the image processing method according to claim 12.

15. The image processing method according to claim 12, further comprising:

determining a filter coefficient of a blurring filter for adjusting a level of a blurring on each pixel of a reference image from among the plurality of images based on the second reference value, wherein the generating the blur-enhanced image comprises generating the blur-enhanced image by performing a filtering processing on a corresponding pixel in the reference image using the blurring filter that comprises the determined filter coefficient.

16. The image processing method according to claim 12, wherein, in the blur-enhanced image, the principal object is in-focus and the portion except the principal object is blurred beyond an actual depth of field of the lens.

* * * * *